United States Patent
Lim et al.

(10) Patent No.: US 9,759,928 B2
(45) Date of Patent: Sep. 12, 2017

(54) OPTICAL IMAGE STABILIZER DETECTING X DIRECTION DISPLACEMENT AND Y DIRECTION DISPLACEMENT OF LENS GROUP

(71) Applicant: Samsung Electro-Mechanics Co., Ltd., Suwon-si (KR)

(72) Inventors: Soo Cheol Lim, Suwon-si (KR); Byung Woo Kang, Suwon-si (KR); Sang Min On, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/853,620

(22) Filed: Sep. 14, 2015

(65) Prior Publication Data
US 2016/0004091 A1    Jan. 7, 2016

Related U.S. Application Data

(63) Continuation of application No. 13/572,803, filed on Aug. 13, 2012, now Pat. No. 9,134,587.

(30) Foreign Application Priority Data

Dec. 22, 2011    (KR) .................. 10-2011-0140262

(51) Int. Cl.
*G02B 27/64*    (2006.01)
*G03B 5/00*    (2006.01)
(Continued)

(52) U.S. Cl.
CPC .......... *G02B 27/646* (2013.01); *G01D 5/142* (2013.01); *G02B 7/08* (2013.01); *G03B 3/10* (2013.01);
(Continued)

(58) Field of Classification Search
CPC ........ G02B 7/04; G02B 27/64; G02B 27/646; H04N 5/23248; H04N 5/23264; H04N 5/2328; H04N 5/23287
(Continued)

(56) References Cited

U.S. PATENT DOCUMENTS 5,689,369 A    11/1997    Noguchi
7,460,775 B2    12/2008    Umezu
(Continued)

FOREIGN PATENT DOCUMENTS

JP    2008-58391 A    3/2008
KR    10-0918816 B1    9/2009
KR    10-2011-0064147 A    6/2011

OTHER PUBLICATIONS

Korean Office Action issued on Dec. 19, 2012 in counterpart Korean Application No. 10-2011-0140262 (4 pages in Korean, 2 pages in English).
(Continued)

*Primary Examiner* — Arnel C Lavarias
(74) *Attorney, Agent, or Firm* — NSIP Law

(57) ABSTRACT

An optical image stabilizer is provided, in which magnets and coils are arranged such that they oppose each other. The Hall sensors are arranged such that one face of each is opposed to one face of the magnets, respectively. The Hall sensors can detect the location of a group of lenses by generating a corresponding signal in response to a variation in magnetic force following a variation in the gap between magnets depending on the direction in which a group of lenses is driven, and simultaneously, in response to a variation in magnetic force that occurs when the group of lenses is displaced in the direction that intersects the direction of the gap.

5 Claims, 5 Drawing Sheets

(51) Int. Cl.
*H02K 41/035* (2006.01)
*G03B 3/10* (2006.01)
*G01D 5/14* (2006.01)
*G02B 7/08* (2006.01)
*H01F 7/02* (2006.01)

(52) U.S. Cl.
CPC ............ *G03B 5/00* (2013.01); *H01F 7/0205* (2013.01); *H02K 41/0356* (2013.01); *G03B 2205/0015* (2013.01); *G03B 2205/0053* (2013.01)

(58) Field of Classification Search
USPC ....... 359/554, 557; 250/201.1, 201.2, 201.4; 396/52, 55; 348/208.99, 208.2, 208.12
See application file for complete search history.

(56) References Cited

U.S. PATENT DOCUMENTS

| | | | |
|---|---|---|---|
| 7,643,750 B2 | 1/2010 | Irisawa et al. | |
| 7,881,598 B1 | 2/2011 | Wu et al. | |
| 8,184,167 B2* | 5/2012 | Inaba | G03B 5/00 348/208.3 |
| 9,134,587 B2* | 9/2015 | Lim | H02K 41/0356 |
| 2006/0093339 A1 | 5/2006 | Umezu | |
| 2009/0252488 A1 | 10/2009 | Eromaki et al. | |
| 2010/0182696 A1 | 7/2010 | Hasegawa | |
| 2011/0013895 A1 | 1/2011 | Chiang | |
| 2012/0140087 A1* | 6/2012 | Ku | H04N 5/23287 348/208.7 |
| 2014/0362284 A1 | 12/2014 | Shin et al. | |
| 2015/0015729 A1 | 1/2015 | Kasamatsu | |
| 2015/0049209 A1 | 2/2015 | Hwang et al. | |

OTHER PUBLICATIONS

Chinese Office Action issued on Feb. 16, 2015 in counterpart Chinese Application No. 201210256971.3 (9 pages in Chinese, 12 pages in English.

* cited by examiner

OPTICAL IMAGE STABILIZER DETECTING X DIRECTION DISPLACEMENT AND Y DIRECTION DISPLACEMENT OF LENS GROUP

CROSS REFERENCE TO RELATED ED APPLICATION

This application is a continuation of U.S. patent application Ser. No. 13/572,803 filed Aug. 13, 2012, which claims the benefit of Korean Patent Application No. 10-2011-0140262, filed on Dec. 22, 2011, entitled "Hand Vibration Correction Device", which is hereby incorporated by reference in its entirety into this application.

BACKGROUND OF THE PRESENT INVENTION

1. Technical Field

The present invention relates, in general, to an optical image stabilizer.

2. Description of the Related Art

As camera modules are having higher-resolution pixels and higher functionality, they are being applied to a wider variety of applications including mobile devices, such as mobile phones, notebook computers and tablet PCs. At the same time, as such applications are becoming smaller and slimmer, camera modules are becoming smaller and slimmer.

Furthermore, conventional autofocus (AF) camera modules are required to have only a group of lenses and an AF drive unit, which drives the lens group, or occasionally a location sensor for increasing the precision of the location of the lens group. Accordingly, such camera modules are rapidly becoming miniaturized and slimmed in relation to camera modules that have an optical image stabilizer (OIS).

That is, the OIS is required to have AF components as well as an OIS drive unit, which drives the lens group in two directions (typically X and Y directions; hereinafter, referred to as "X and Y directions"), which perpendicularly intersect the optical axis (Z axis). In order to increase the precision of the operation of the OIS, location sensors capable of measuring the location of the lens group are typically required in the two directions (X, Y), which perpendicularly intersect the optical axis (Z axis).

Accordingly, the miniaturization and slimness profile of the OIS may be determined by how the AF driving unit and the location sensors of the OIS are configured and arranged with the AF.

Two types of location sensors, including a Hall sensor and a photoreflector (PR) sensor, are widely used. The PR sensor radiates a predetermined amount of diffused light from the sensor itself, and then measures the amount or intensity of light that reflects from an opposing reflector plate and returns to the sensor. In this fashion, the PR sensor measures the location of the opposing reflector plate by detecting a variation in the amount or intensity of light that occurs when a relative displacement between the PR sensor and the opposing reflector plate occurs.

In addition, the Hall sensor causes a variation in a signal in response to a variation in magnetic force. Due to such characteristics, the Hall sensor has been widely used in measuring the location of the AF drive unit, which is constructed of magnets and coils. In the AF drive unit, which is generally constructed of magnets and coils, the magnets are used in such a way that they are opposed to the Hall sensor, or third magnets dedicated to the Hall sensor are additionally provided.

Here, since the size of the Hall sensor is currently being decreased, its use in a camera module including the OIS is gradually increasing.

However, the OIS is required to drive a group of lenses independently and respectively (without a mutual relationship) in the X and Y directions in response to vibration of the hand of a user. Therefore, there is a problem in that it is difficult to measure any displacement simultaneously in the X and Y directions using one Hall sensor.

That is, although one Hall sensor can measure the displacement in two axes depending on how the Hall sensor is fabricated, this type of Hall sensor is actually one Hall sensor chip into which two sensors are incorporated rather than a single Hall sensor. Accordingly, in fact, the Hall sensor does not greatly contribute to the miniaturization or slimness of the OIS.

In addition, the magnets opposing the Hall sensor are typically arranged such that predetermined gaps are maintained between the Hall sensor and the magnets. The Hall sensor is configured such that it can detect when a relative displacement occurs in the direction that perpendicularly intersects the direction of the gaps. Since the OIS is subjected to the miniaturization and slimness as described above, the importance of the arrangement of the Hall sensor and the magnets is further increasing.

The arrangement of the Hall sensor and the magnets in the related art is specifically disclosed in Patent Document 1 (U.S. Pat. No. 7,881,598 B1) and Patent Document 2 (US2011-0013895 A1). According to Patent Document 1, Hall sensors are mounted such that each Hall sensor is opposed to a corresponding magnet. A relative displacement is made without a variation in opposing gaps when the magnets are moved in the X and/or Y directions.

In addition, Patent Document 2 discloses optical image stabilization that is performed by tilting the entire AF module, to which a group of lenses and an image pickup device are coupled, in the opposite direction to the vibration of the hand.

In an example, when a displacement in the direction of a gap is detected from two Hall sensors, the tilt between the lens group and the image pickup device is calculated.

Furthermore, Patent Document 3 (KR0918816 B1) discloses a technique in which a PR sensor is employed instead of the Hall sensor, in which a location sensor is not opposed to magnets but to a component that acts as a reflector plate. Such a PR sensor measures the amount of a variation in the gap between the sensor and the reflector plate. If the reflector plate is sufficiently wide, there is no variation in a signal when the lens group is driven in the direction that intersects the direction of the gaps. Therefore, respective PR sensors, which are arranged along the X and Y axes, can perform measurement independently or without signal coupling.

SUMMARY OF THE PRESENT INVENTION

However, in the arrangement of the Hall sensors and the magnets, which are disclosed in Patent Document 1, a linear component of a signal that is generated by each Hall sensor may be excessively small since the thickness of the magnets is small.

Therefore, the Hall sensor detects the opposing magnet when the magnet is driven along the X axis. A hall signal is small when the magnet is driven along the Y axis. Therefore, in most cases, a signal in response to a variation in the X axial direction can be detected, which is problematic. In addition, the Hall sensors are arranged in the thickness direction of a camera module, thereby acting as an obstructing factor against miniaturization and slimness.

The technology disclosed in Patent Document 2 has the problem in that the AF module must be tilted in the opposite direction to the trembling of the hand. Patent Document 3 has the problem in that four PR sensors must be used such that respective axes are paired in order to compensate for the initial sensitivities of the PR sensors, which vary depending on external temperatures.

That is, the PR sensor, which is used as a location sensor in the above-mentioned Patent Document 3, is more temperature-sensitive than the Hall sensor, and in some cases, temperature correction is necessary for precise measurement or in order to compensate for a measurement error.

Accordingly, the present invention has been made keeping in mind the above problems occurring in the related art, and the present invention is intended to propose an optical image stabilizer, in which miniaturization and a slim profile can be easily realized by the improvement of the arrangement between a Hall sensor and magnets.

In order to achieve the above objects, according to one aspect of the present invention, there is provided an optical image stabilizer that includes a drive unit including a magnet and a coil, the magnet being disposed along an optical axis (Z axis) of a camera module; and a Hall sensor, a face of the Hall sensor being opposed to a face of the magnet.

In an exemplary embodiment, the Hall sensor is smaller than the thickness of the coil.

In an exemplary embodiment, the Hall sensor is disposed inside or outside the coil.

In an exemplary embodiment, the Hall sensor is disposed between an S pole and an N pole of the magnet.

According to another aspect of the present invention, there is provided an optical image stabilizer that includes a magnet provided in an auto-focusing unit, which includes an autofocus device so that a lens barrel is linearly movable, the magnet being disposed along an optical axis (Z axis); a coil provided in a housing, which is provided inside the auto-focusing unit, the coil being opposed to the magnet; and a Hall sensor provided in the housing, a face of the Hall sensor being opposed to a face of the magnet.

In an exemplary embodiment, the coil is provided as a plurality of coils, which are arranged about the lens barrel such that the coils intersect each other.

In an exemplary embodiment, the coil is provided as a plurality of coils, and the Hall sensor is provided in at least two of the coils.

In an exemplary embodiment, the Hall sensor is arranged inside or outside the coil.

In an exemplary embodiment, the Hall sensor is smaller than the thickness of the coil.

In an exemplary embodiment, the Hall sensor is disposed between an S pole and an N pole of the magnet.

According to the construction of the exemplary embodiments, since the Hall sensor is arranged such that one face thereof is opposed to one face of the magnet, it can easily detect the location of a group of lenses by generating a corresponding signal in response to a variation in magnetic force following a variation in the gap between magnets depending on the direction in which a group of lenses is driven, and simultaneously, in response to a variation in magnetic force that occurs when the group of lenses is displaced in the direction that intersects the direction of the gap. Accordingly, the optical image stabilizer of the present invention can have a small size and a slim profile, which can be easily achieved compared to the optical image stabilizer of the related art.

Since the degree of freedom of design can be obtained by the improvement of the arrangement between the Hall sensor and the magnets, the optical image stabilizer can be easily imparted with a small size and a slim profile.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE PRESENT INVENTION

Figure 1:
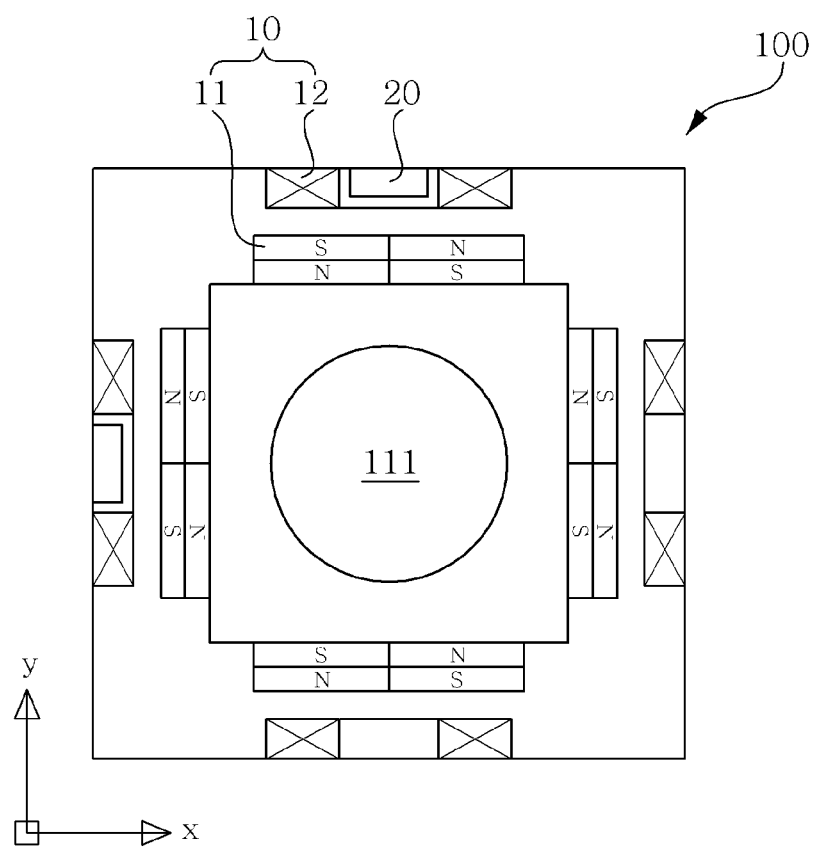
FIG. 1 is a schematic view showing an optical image stabilizer according to an embodiment of the present invention.

The objects, particular advantages and novel features of the present invention will be more apparent from the following description and exemplary embodiments, with reference to the accompanying drawings. In describing the present invention, if it is determined that the detailed description of the related known technology would make the gist of the present invention unnecessarily ambiguous, the detailed description will be omitted.

Reference will now be made in greater detail to exemplary embodiments of the present invention, examples of which are illustrated in the accompanying drawings.

An optical image stabilizer (OIS) according to an exemplary embodiment of the present invention includes a drive unit 10, which includes magnets 11 disposed along the optical axis (z axis) of a camera module 100, and Hall sensors 20, one face of each of which is opposed to a corresponding face of the magnets 11.

Each Hall sensor 20 generates a variation in a signal in response to a variation in magnetic force. In this fashion, the Hall sensor 20 detects the location by generating a corresponding signal in response to a variation in magnetic force following a variation in the gap between magnets, and simultaneously, in response to a variation in magnetic force that occurs when the lens group 111 is displaced in the direction that intersects the direction of the gap.

Accordingly, as shown in FIG. 1, the Hall sensors 20 are disposed such that the face of each Hall sensor 20 is opposed to the face of the magnets 11, which are disposed in the direction of the optical axis (z axis) of the camera module 100. Then, the Hall sensors 20 perpendicularly intersect each other in two directions. When the lens group 111 is displaced in X and Y directions, the Hall sensors 20 and the magnets 11 are simultaneously subjected to a variation in magnetic force by the displacement in the X and Y directions, and the hall signals change responsively.

That is, when the lens group 111 is displaced in only the X direction, the Hall sensor 20 detects only the displacement in the X direction. However, when a displacement in the Y direction occurs at the same time, the Hall sensor 20 can also detect the displacement in the Y direction. This will be described in detail as follows.

Figure 2:
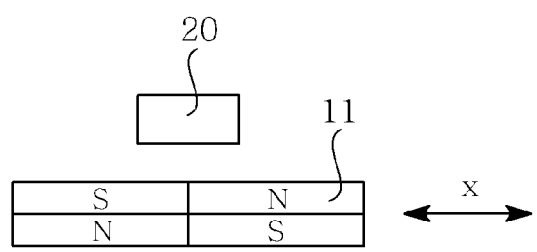
FIG. 2 and FIG. 3 are enlarged views showing a direction in which the optical image stabilizer according to an embodiment of the present invention is driven.
Figure 3:
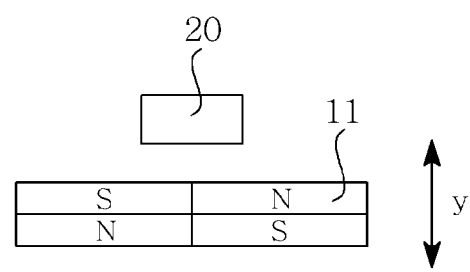

First, as shown in FIG. 2, when the magnets 11 are driven in the direction that intersects the direction of the gaps, the value of the sensitivity of the Hall sensor 20 is defined as α. As shown in FIG. 3, when the magnets are driven in the direction of the gaps, the value of the sensitivity of the Hall sensor 20 is defined as β.

Here, when the lens group 111 is displaced as much as x and y in the X and Y directions, signal values measured by respective Hall sensors 20 are set as Hall_1 and Hall_2, which can be arranged as in Formula 1 below.

$$\text{Hall}\_1 = \alpha(y) \cdot x + \beta(x) \cdot y$$

$$\text{Hall}\_2 = -\beta(x) \cdot x + \alpha(y) \cdot y \quad \text{Formula 1}$$

In Formula 1, α(y) means that α is not a constant but has a function condition for y; i.e. the value of α may vary depending on the distance in the Y direction. If the value of α does not vary or the amount of a displacement is very small, α(y) can be simplified to a constant value α. This is the same for β(x).

Therefore, if the Hall sensor 20 and the magnets 11 are designed such that they oppose each other as in the present invention, intended displacements x and y in the X and Y directions can be obtained from Formula 1. The displacements x and y are obtained as follows.

$$x = [\alpha(y)\text{Hall}\_1 - \beta(x)\text{Hall}\_2] / [\alpha(y)^2 + \beta(x)^2]$$

$$y = [\beta(x)\text{Hall}\_1 + \alpha(y)\text{Hall}\_2] / [\alpha(y)^2 + \beta(x)^2] \quad \text{Formula 2}$$

Thus, the displacements x and y in the X and Y directions can be obtained from Formula 2 above. Since the Hall sensor 20 is not required to be arranged under the magnets 11 unlike the related art, the OIS having the above-described configuration can have a slim profile. When the OIS is installed in the camera module 100, no part of the volume is increased by the Hall sensor 20. Therefore, the OIS can also be miniaturized.

Figure 4:
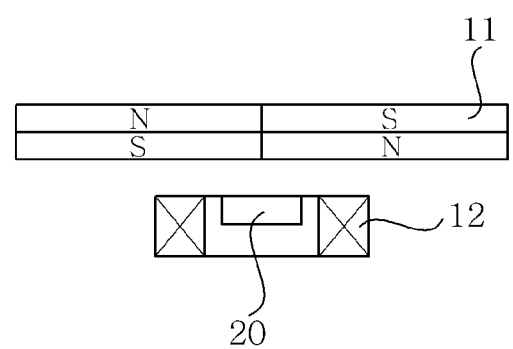
FIG. 4 to FIG. 7 are schematic views showing examples of the arrangement of the Hall sensor according to embodiments of the present invention.
Figure 5:
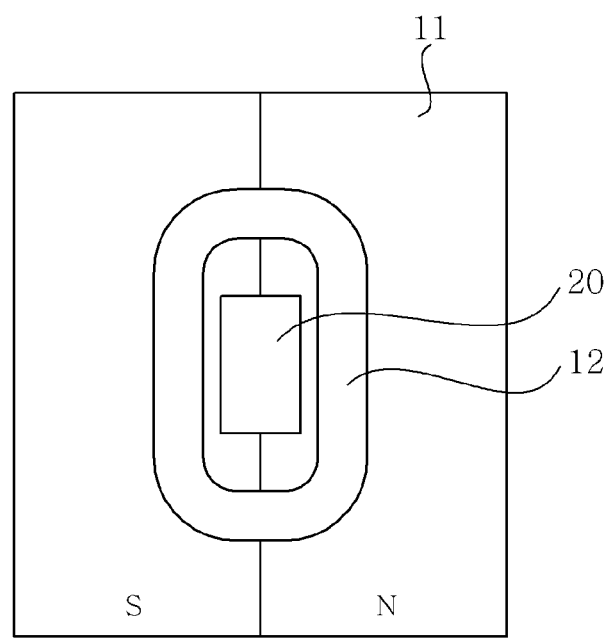

In addition, the slim profile can be easily realized since the Hall sensor 20 can be generally formed so as to be smaller than the thickness of a coil 12. Specifically, as shown in FIG. 4 and FIG. 5, the Hall sensor 20 can be provided in the coil 12, which is opposed to the magnets 11, such that the Hall sensor 20 is opposed to the magnets 11. Here, since the Hall sensor 20 is formed so as to be smaller than the thickness of the coil 12, the entire profile can be slimmed.

Figure 6:
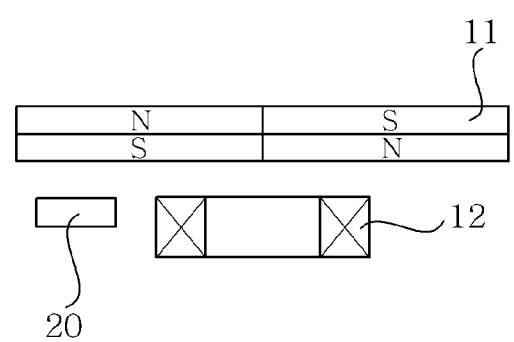
Figure 7:
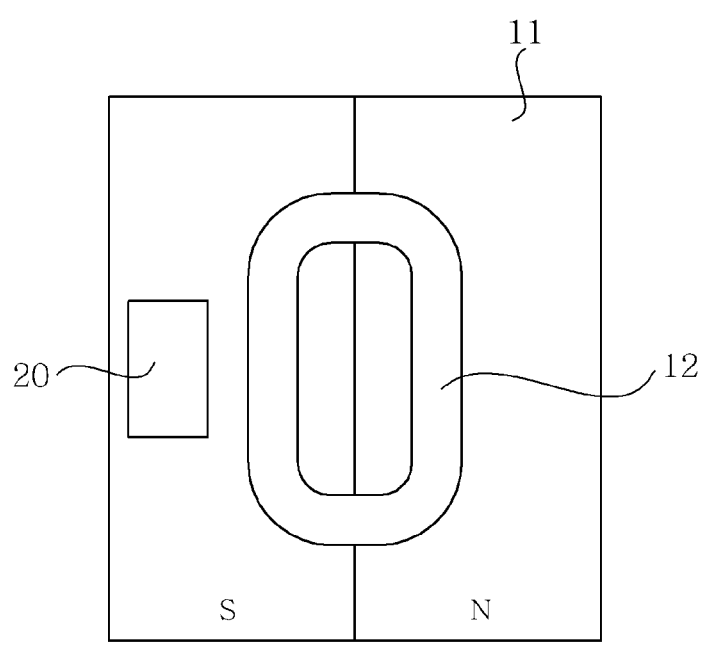

The Hall sensor 20 can also be disposed inside the coil 12, particularly, in the center of the inner portion of the coil 12. Alternatively, as shown in FIG. 6 and FIG. 7, the Hall sensor 20 can be disposed outside the coil 12, more particularly, adjacent to a side of the coil 12. Accordingly, depending on the design of the camera module 100, the Hall sensor 20 can freely detect the displacement in the X and Y directions, the perspective, or the like of the lens group 111.

In addition, the Hall sensor 20 may be arranged between the S pole and the N pole of the magnets 11, such that it easily measures a displacement in the direction in which the gap between the magnets 11 is varied or in the direction in which the gap between the magnets 11 is not varied.

However, the arrangement between the Hall sensor 20 and the opposing magnets 11 is not to be construed as requirements, but should be construed as additional conditions that make it easy for the Hall sensor to measure a displacement in the direction in which the gap is varied and in the direction in which the gap is not varied.

Figure 8:
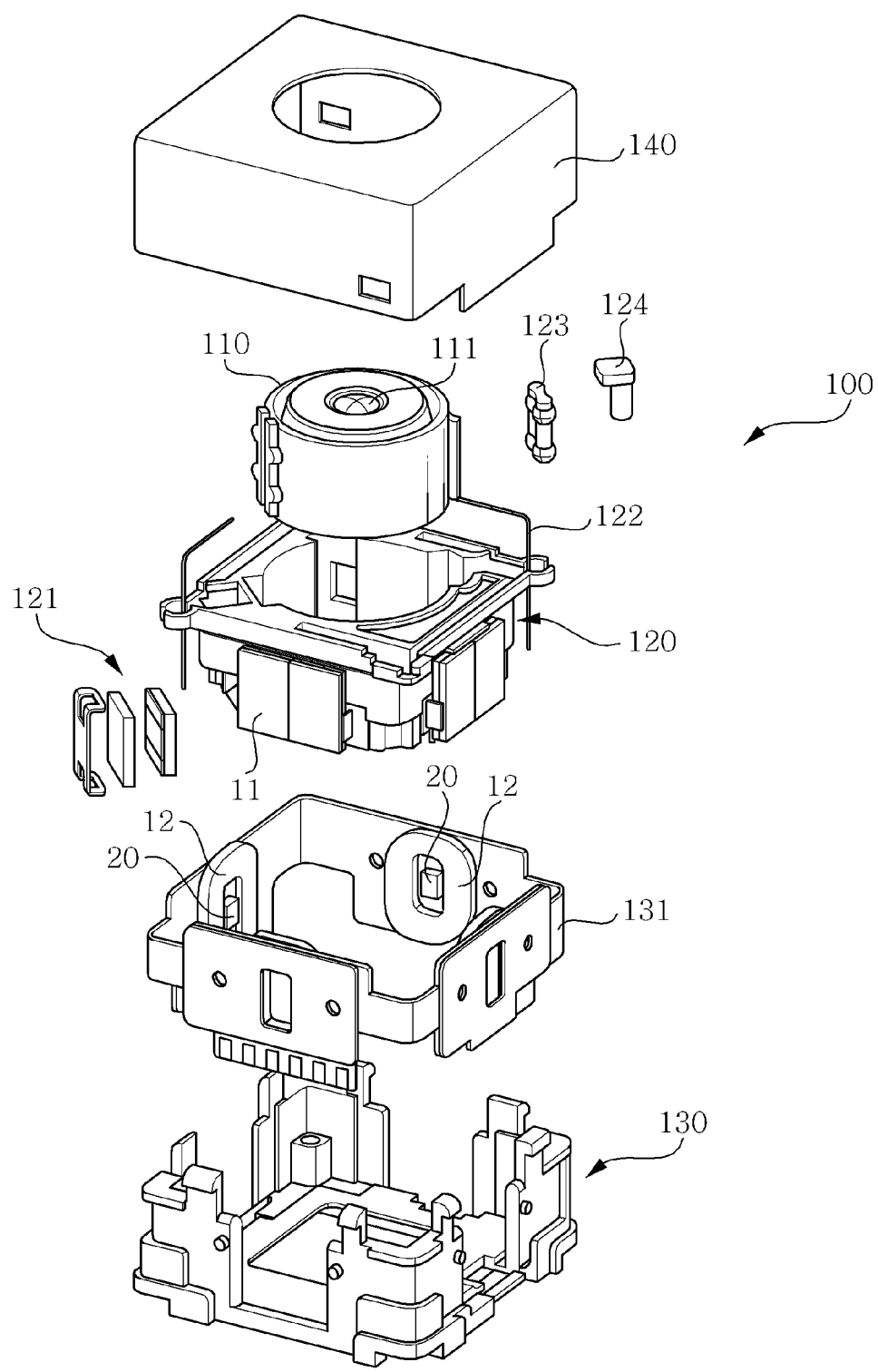
FIG. 8 is an exploded perspective view showing an optical image stabilizer according to an embodiment of the present invention, which is installed in a camera module.

The OIS according to an exemplary embodiment of the present invention can be installed in the camera module 100 as follows. As shown in FIG. 8, the magnets 11 are provided in an auto-focusing unit 120 in the direction of the optical axis (Z axis). The auto-focusing unit 120 includes an auto-focus (AF) device 121 so that a lens barrel 110, which has the lens group 111, can be moved linearly.

The lens barrel 110 is driven in the direction of the optical axis (Z axis) along a friction rod so as to move linearly. Here, support members 122 fixed to the auto-focusing unit 120 can support the lens barrel 110 such that the lens barrel 110 can be driven along the optical axis (Z axis). A linear bearing assembly 123 and a bearing stopper 124 may be provided outside the lens barrel 110.

The AF device 121 includes a piezoelectric actuator, a voice coil actuator, or the like, enables an image of a subject to be formed on an image pickup device using such an actuator, and adjusts the focus of the formed image so that a clearer image can be produced.

The piezoelectric actuator is employed as an embodiment in the present invention. The piezoelectric actuator vibrates in response to a voltage that is applied thereto, thereby driving the lens barrel 110 along the optical axis (Z axis).

The magnets 11 provided in the auto-focusing unit 120, which includes the AF device 121, are configured as a hexahedron, in which the S and N poles thereof are bilaterally divided. The magnets 11 are provided on the outer portion of the auto-focusing unit 120.

A plurality of coils 12, which constitute the drive unit 10 together with the magnets 11, is provided inside a housing 130, inside of which the auto-focusing unit 120 is provided. The coils 12 are arranged to oppose the magnets 11 so that electromagnetic force can be generated between the coils 12 and the magnets 11. The Hall sensor 20 is also provided inside the housing 130 such that the face of the Hall sensor 20 is opposed to the face of the magnets 11. The Hall sensor 20 is arranged between the S pole and the N pole of the magnets 11 such that it can easily measure a displacement in the direction in which the gap between the magnets 11 is varied or in the direction in which the gap between the magnets 11 is not varied.

Here, a flexible printed circuit board 131, which connects an external power supply to the coils 12, may be provided inside the housing. In this case, the coils 12 and the Hall sensor 20 are disposed on the flexible printed circuit board 131, and are electrically connected to a power supply. This configuration is illustrated as an embodiment.

In addition, the coils 12 may be arranged about the lens barrel 110 such that they intersect each other. An embodiment in which four coils 12 are provided inside the housing 130 is illustrated. Here, Hall sensors 20 are disposed in at least two of the four coils 12 such that the Hall sensors 20 perpendicularly intersect the magnets 11 in two directions.

Accordingly, when the lens barrel 110 is displaced in the X and Y directions, the Hall sensors 20 and the magnets 11 are subjected to a variation in magnetic force in response to the X and Y axial displacement. A hall signal is then responsively varied, so that the Hall sensor detects the location of the lens barrel.

In addition, the Hall sensor 20 can be disposed inside or outside the coil 12 so that it can freely detect the X and Y directional location/displacement, perspective, or the like of the lens group 111 based on the intensity of a magnetic field depending on the design of the camera module 100. Here, the Hall sensor 20 may be formed to be smaller than the thickness of the coil 12, thereby preventing the overall area of the camera module 100 from increasing.

The camera module 100 to which the OIS of the present invention is applied can easily achieve the degree of freedom of the design between the Hall sensor 20 and the opposing magnets 11, and thus be miniaturized and have a slim profile.

In addition, the camera module 100 may also include a shield can 140 in addition to the lens barrel 110, the auto-focusing unit 120 and the housing 130. The shield can 140 protects the camera module 100 from external impact or the environment while blocking electromagnetic interference (EMI).

Although exemplary embodiments of the present invention have been described in detail, they are for illustrative purposes only, but the present invention is not limited thereto. Various modifications, additions and substitutions will be apparent to a person having ordinary skill in the art without departing from the scope and spirit of the present invention.

Simple variations and changes to the present invention fall within the scope of the present invention, which shall be defined by the accompanying claims.

What is claimed is:

1. An optical image stabilizer comprising:
   at least two magnets disposed along an optical axis in side surfaces of an auto-focusing unit, the side surfaces of the auto-focusing unit being parallel to the optical axis, and the auto-focusing unit comprising an autofocus device configured to linearly move a lens barrel;
   at least two coils disposed in a housing, the auto-focusing unit being disposed inside the housing, and the two coils being disposed opposite to the two magnets, respectively; and
   at least two Hall sensors disposed in side surfaces of the housing, wherein a face of each Hall sensor is disposed opposite to a face of respective magnets,
   wherein the Hall sensors are disposed in side surfaces of the housing that are parallel to the side surfaces of the auto-focusing unit, and
   wherein the auto-focusing unit is linearly moved in a perpendicular direction of the optical axis direction for the optical image stabilizing by interaction between the two coils and the two magnets.

2. The optical image stabilizer of claim 1, wherein the Hall sensors are disposed inside of the coils.

3. The optical image stabilizer of claim 1, wherein the Hall sensors are thinner than a thickness of the coils.

4. The optical image stabilizer of claim 1, wherein the Hall sensors are disposed between an S pole and an N pole of the respective magnets.

5. The optical image stabilizer of claim 1, wherein the Hall sensors are disposed outside of the coils.

* * * * *